(12) United States Patent
Wang

(10) Patent No.: US 12,463,306 B2
(45) Date of Patent: Nov. 4, 2025

(54) METHOD FOR ASSEMBLING POLE TERMINAL OF CYLINDRICAL BATTERY

(71) Applicant: YANTAI LIHUA ELECTRIC POWER TECHNOLOGY CO., LTD., Yantai (CN)

(72) Inventor: Hanchao Wang, Yantai (CN)

(73) Assignee: YANTAI LIHUA ELECTRIC POWER TECHNOLOGY CO., LTD., Yantai (CN)

( * ) Notice: Subject to any disclaimer, the term of this patent is extended or adjusted under 35 U.S.C. 154(b) by 0 days.

(21) Appl. No.: 18/894,089

(22) Filed: Sep. 24, 2024

(65) Prior Publication Data

US 2025/0233288 A1 Jul. 17, 2025

Related U.S. Application Data

(63) Continuation of application No. PCT/CN2024/083983, filed on Mar. 27, 2024.

(30) Foreign Application Priority Data

Jan. 11, 2024 (CN) .......................... 202410044654.8

(51) Int. Cl.
| | |
|---|---|
| *H01M 50/566* | (2021.01) |
| *H01M 50/179* | (2021.01) |
| *H01M 50/184* | (2021.01) |
| *H01M 50/559* | (2021.01) |
| *H01M 50/562* | (2021.01) |

(Continued)

(52) U.S. Cl.
CPC ....... *H01M 50/566* (2021.01); *H01M 50/179* (2021.01); *H01M 50/184* (2021.01); *H01M 50/559* (2021.01); *H01M 50/562* (2021.01); *H01M 50/567* (2021.01); *H01M 50/588* (2021.01)

(58) Field of Classification Search
CPC .............................. Y02E 60/10; Y02E 60/004
See application file for complete search history.

(56) References Cited

FOREIGN PATENT DOCUMENTS

| CN | 101651186 A | 2/2010 |
|---|---|---|
| CN | 101908641 A | * 12/2010 |

(Continued)

OTHER PUBLICATIONS

CN101908641 Eng Translation (Year: 2006).*

(Continued)

*Primary Examiner* — Stephen J Yanchuk

(57) ABSTRACT

A method for assembling a pole terminal of a cylindrical battery includes the following steps: step 1: laser welding an irregular-shaped screw at a central position of a current collector plate, to form a composite current collector plate; step 2: laser welding the current collector plate to a tab of a core; step 3: covering the current collector plate with an insulating sheet; step 4: covering the insulating sheet and the core with a housing with an opening facing downward, where the irregular-shaped screw extends upward through an irregular-shaped hole to reach an outer side of a top of the housing; step 5: combining a nut and a nut seal gasket to form a composite nut; step 6: rotatably mounting the composite nut on the irregular-shaped screw; and step 7: welding and fixing a threaded fit between the nut and the irregular-shaped screw from above with laser.

10 Claims, 5 Drawing Sheets

(51) Int. Cl.
*H01M 50/567* (2021.01)
*H01M 50/588* (2021.01)

(56) References Cited

FOREIGN PATENT DOCUMENTS

| | | | | | |
|---|---|---|---|---|---|
| CN | 102136561 | A | * | 7/2011 | .......... H01M 50/103 |
| CN | 104466077 | A | | 3/2015 | |
| CN | 204361138 | U | | 5/2015 | |
| CN | 216958261 | U | | 7/2022 | |
| CN | 219086102 | U | | 5/2023 | |
| JP | 2000021367 | A | * | 1/2000 | |
| WO | 2022116909 | A1 | | 6/2022 | |
| WO | WO-2024189972 | A1 | * | 9/2024 | ............ H01M 50/55 |

OTHER PUBLICATIONS

CN 102136561 Eng Translation (Year: 2011).*
JP2000021367A Eng Translation (Year: 2000).*
WO 2024189972 (Year: 2023).*
Internation Search Report of PCT/CN2024/083983, Mailed Aug. 26, 2024.

\* cited by examiner

METHOD FOR ASSEMBLING POLE TERMINAL OF CYLINDRICAL BATTERY

CROSS-REFERENCE TO RELATED APPLICATIONS

The present disclosure is a continuation-application of International (PCT) Patent Application No. PCT/CN2024/083983, filed on Mar. 27, 2024, which claims priority of Chinese Patent Application No. 202410044654.8, filed on Jan. 11, 2024, the entire contents of which are hereby incorporated by reference in their entirety.

TECHNICAL FIELD

The present application relates to the field of cylindrical battery technologies, and in particular, to a method for assembling a pole terminal of a cylindrical battery.

BACKGROUND

At present, a pole terminal structure of a cylindrical battery usually includes a pole body and a housing. The pole body has an integral structure, and is generally made of copper. The housing is fixed respectively on an inner side and an outer side of the pole body in a rivet form. A seal gasket is placed between the pole body and the housing for sealing and insulation. The pole terminal structure in this form mainly has the following disadvantages during actual application:

First, the bending of a rivet on the inner side of the pole body occupies a large internal space of the cylindrical battery, resulting in poor utilization of the internal space of the cylindrical battery.

Second, the pole body and a current collector plate need to be welded, leading to a positioning difficulty. In addition, during welding, a lot of metal debris tends to be generated during welding and affects the electrical performance inside the battery, resulting in the problem of instable internal resistance of the battery.

Third, because the pole body and the housing are integrally combined, a single material is used and is not replaceable, resulting in insufficient use flexibility for a pack end.

In summary, the foregoing problems of the pole terminal structure of the cylindrical battery already become pressing technical difficulties in the industry.

SUMMARY

To make up for the deficiencies in existing technologies, the present application provides a method for assembling a pole terminal of a cylindrical battery, to resolve the previous problem that a pole terminal structure occupies a large internal space of a cylindrical battery, resolve the previous problems that positioning difficulty exists during welding of a pole body and a current collector plate and the electrical performance inside a battery is affected, and resolve the previous problems a pole body has a single material and use flexibility for a pack end is poor.

The technical solution adopted in the present application to resolve the foregoing technical problems is as follows:

A method for assembling a pole terminal of a cylindrical battery includes the following specific steps:

step 1: laser welding an irregular-shaped screw at a central position of a current collector plate, and sleeving an irregular-shaped seal gasket on an outer side of the irregular-shaped screw, to form a composite current collector plate;

step 2: laser welding the current collector plate to a tab of a core, and arranging the irregular-shaped screw facing upward;

step 3: covering the current collector plate with an insulating sheet;

step 4: covering the insulating sheet and the core with a housing with an opening facing downward, and opening an irregular-shaped hole fitting the irregular-shaped seal gasket at a center of a top of the housing for positioning, where the irregular-shaped screw extends upward through the irregular-shaped hole to reach an outer side of the top of the housing;

step 5: combining a nut and a nut seal gasket to form a composite nut;

step 6: rotatably mounting the composite nut on the irregular-shaped screw, and fitting and tightening the nut and the irregular-shaped screw to clamp and fix the housing; and step 7: welding and fixing a threaded fit between the nut and the irregular-shaped screw from above with laser.

The irregular-shaped screw includes a screw base, an irregular-shaped screw rod, and a threaded rod, and the screw base and the current collector plate are laser welded.

The irregular-shaped seal gasket and the irregular-shaped screw rod are integrally combined.

The insulating sheet is configured to isolate a short-circuit mode between the current collector plate and the housing.

The irregular-shaped seal gasket and the irregular-shaped hole fit to position mounting of the housing.

The nut and the nut seal gasket are integrally combined.

The nut seal gasket and the irregular-shaped seal gasket fit for isolating a short-circuit mode between the nut and the irregular-shaped screw and the housing.

A material of the nut includes aluminum, copper, nickel, or copper-plated nickel.

The current collector plate and the irregular-shaped screw are made of copper.

The housing is made of aluminum.

The present application adopts the foregoing solution and has the following advantages:

The composite current collector plate is arranged, the irregular-shaped screw is fixed at the central position of the composite current collector plate. The irregular-shaped screw extends upward through the top of the housing to be threadedly connected to the composite nut. The composite nut and the irregular-shaped screw fit and are tightened to clamp and fix the housing. The costs of structural members are greatly reduced, device investment costs are greatly reduced, high-speed automatic high-reliability assembly can be implemented, and the solution is applicable to a large-batch production and manufacturing process. A positioning requirement in an assembly process is met, and a good electrical connection can be ensured. The yield of a processing process is significantly increased. The reliability of sealing and electrical connections is effectively ensured. In addition, the internal space of a cylindrical battery is fully saved. The material of a nut can be flexibly selected for a pack application end, so that the application range is wide, the manufacturability is improved, and the production line compatibility is high.

Figure 1:
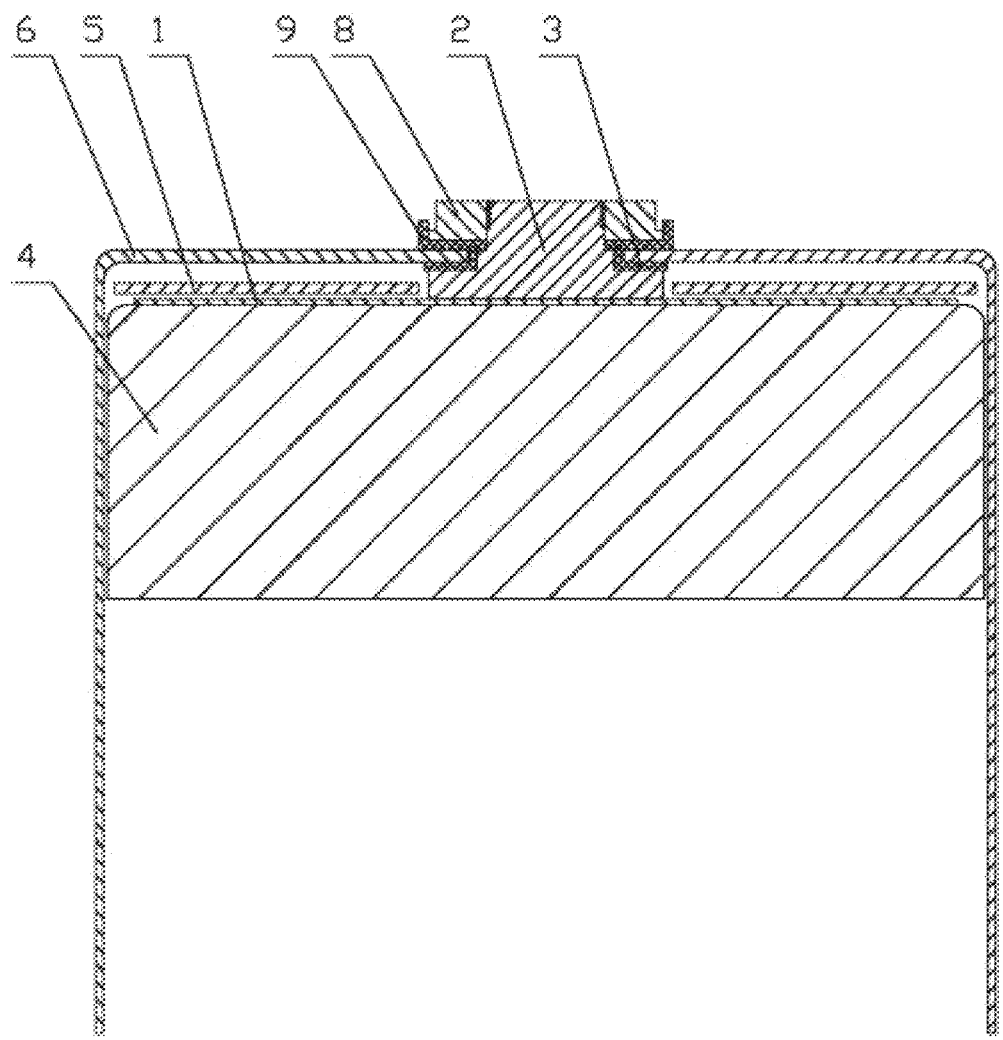
FIG. 1 is a schematic structural cross-sectional view according to the present application.

In the drawings: 1. current collector plate, 2. irregular-shaped screw, 3. irregular-shaped seal gasket, 4. core, 5. insulating sheet, 6. housing, 7. irregular-shaped hole, 8. nut, 9. nut seal gasket, 10. screw base, 11. irregular-shaped screw rod, and 12. threaded rod.

DESCRIPTION OF THE EMBODIMENTS

To clearly describe the technical features of the solution, the following is a detailed description of the present application through specific embodiments and in conjunction with the accompanying drawings thereof.

Figure 2:
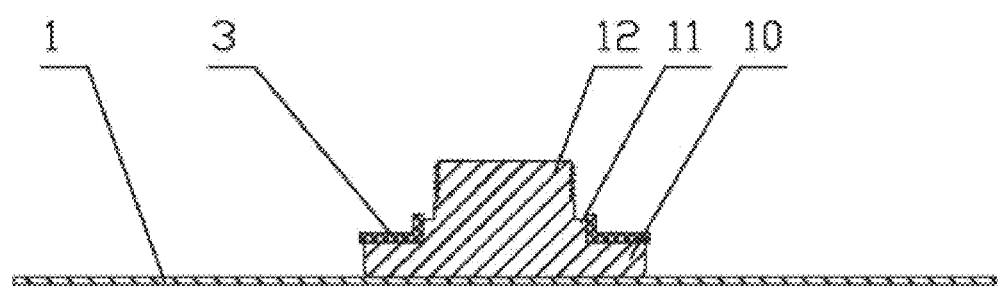
FIG. 2 is a schematic structural cross-sectional view of a composite current collector plate according to the present application.
Figure 3:
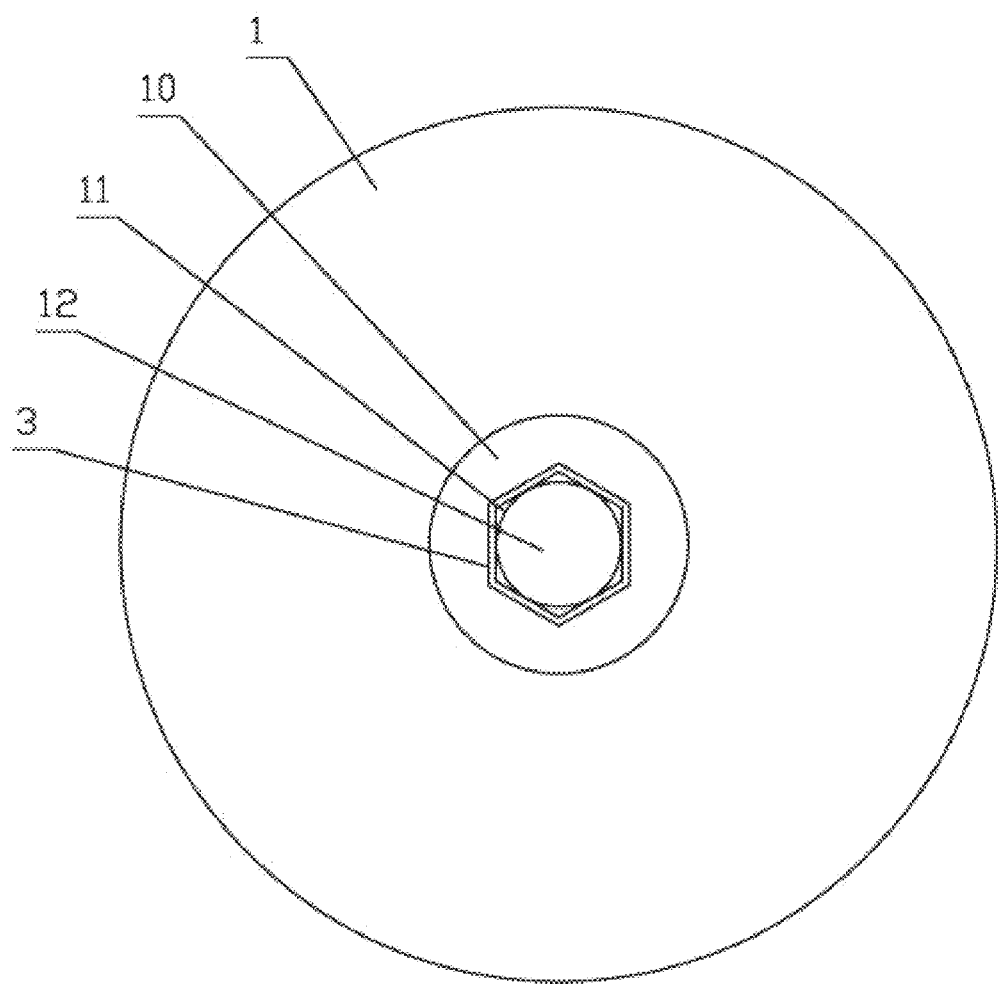
FIG. 3 is a schematic structural top view of a composite current collector plate according to the present application.
Figure 4:
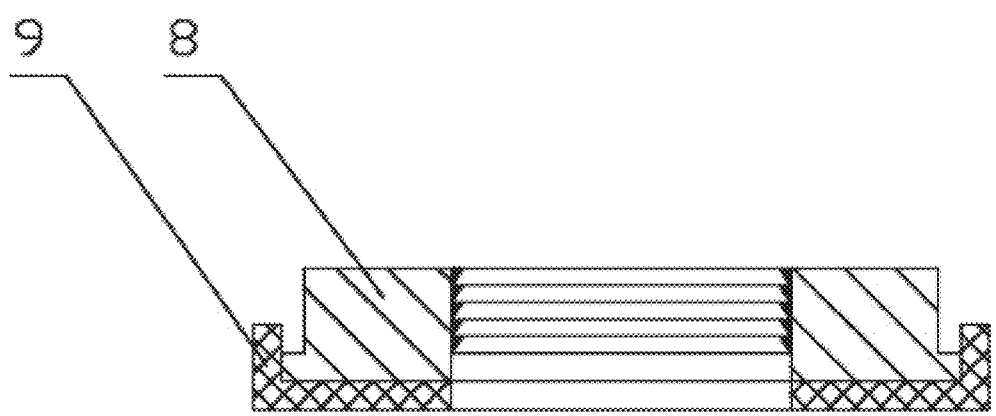
FIG. 4 is a schematic structural cross-sectional view of a composite nut according to the present application.
Figure 5:
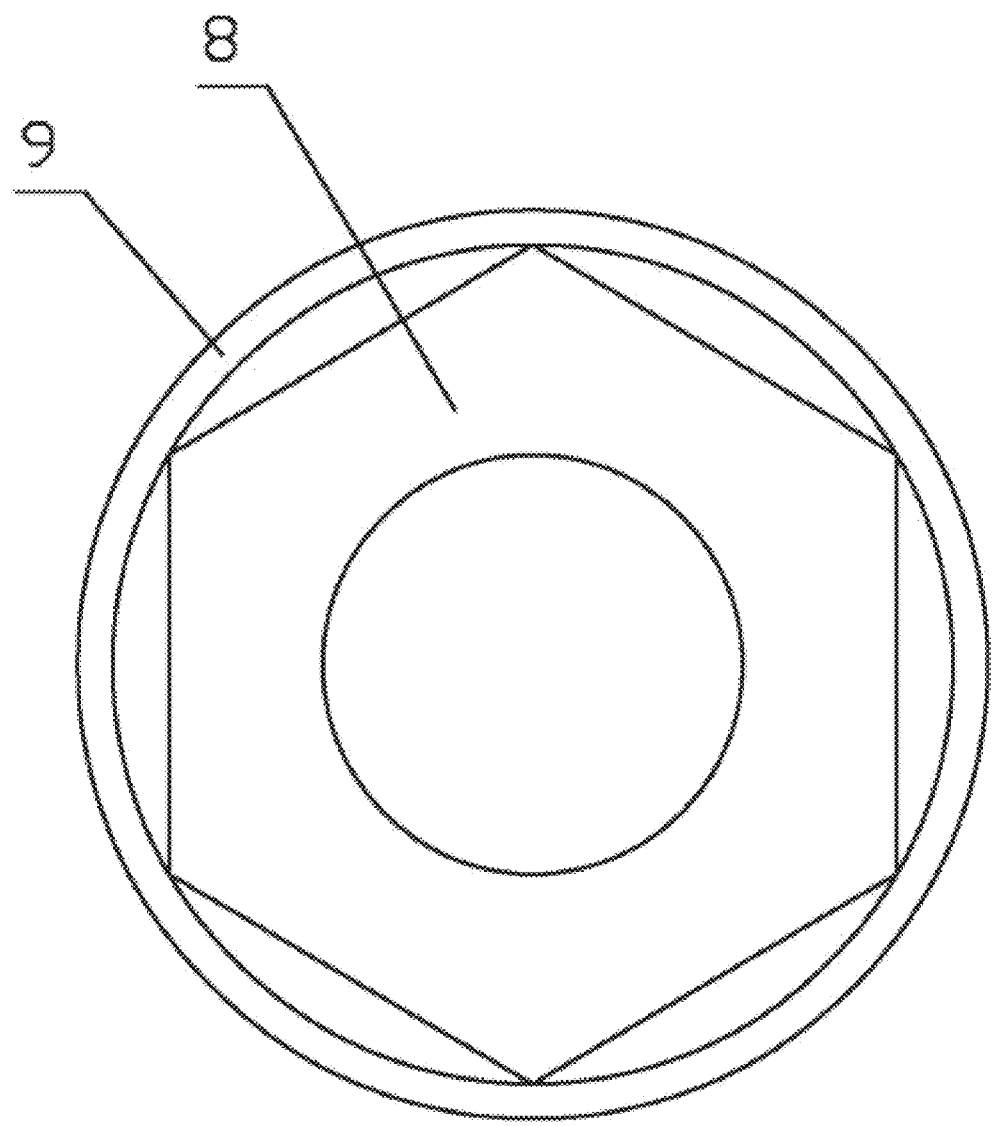
FIG. 5 is a schematic structural top view of a composite nut according to the present application.
Figure 6:
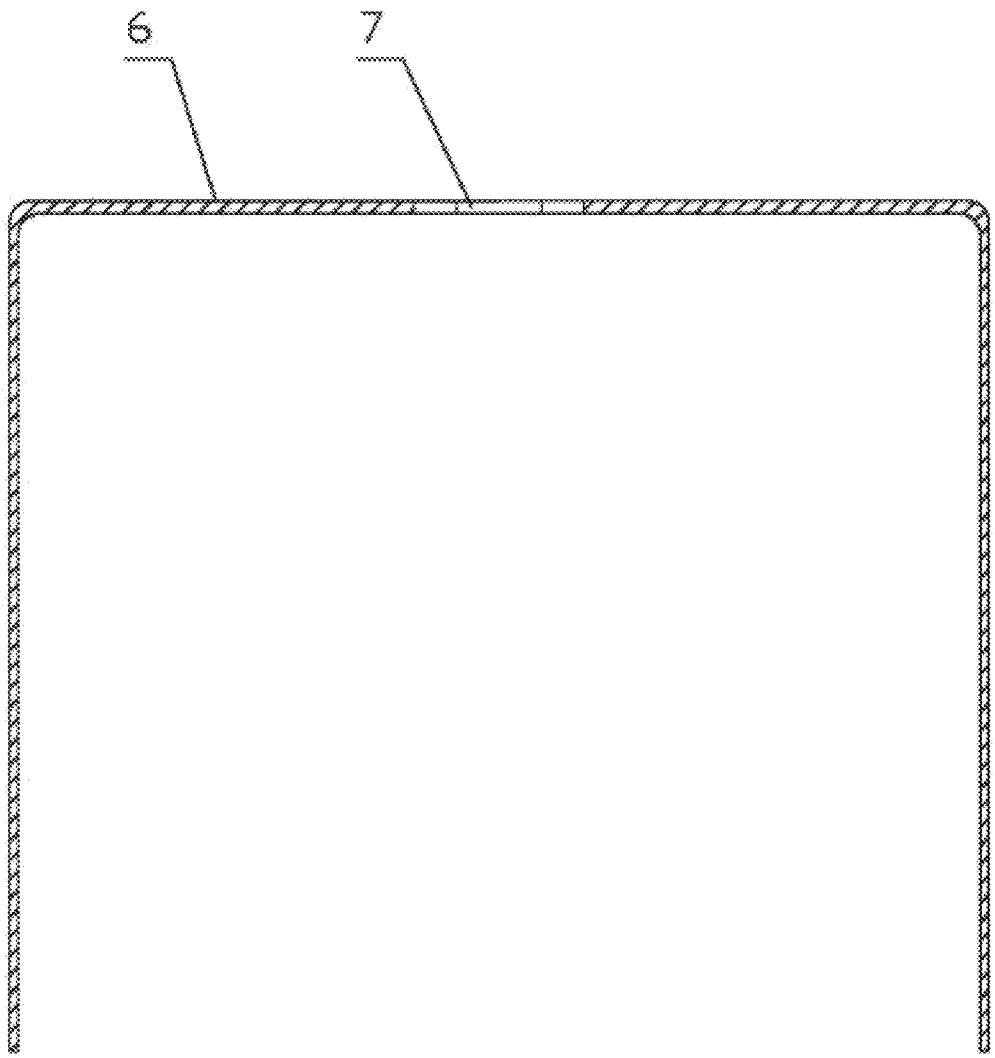
FIG. 6 is a schematic structural cross-sectional view of a housing according to the present application.
Figure 7:
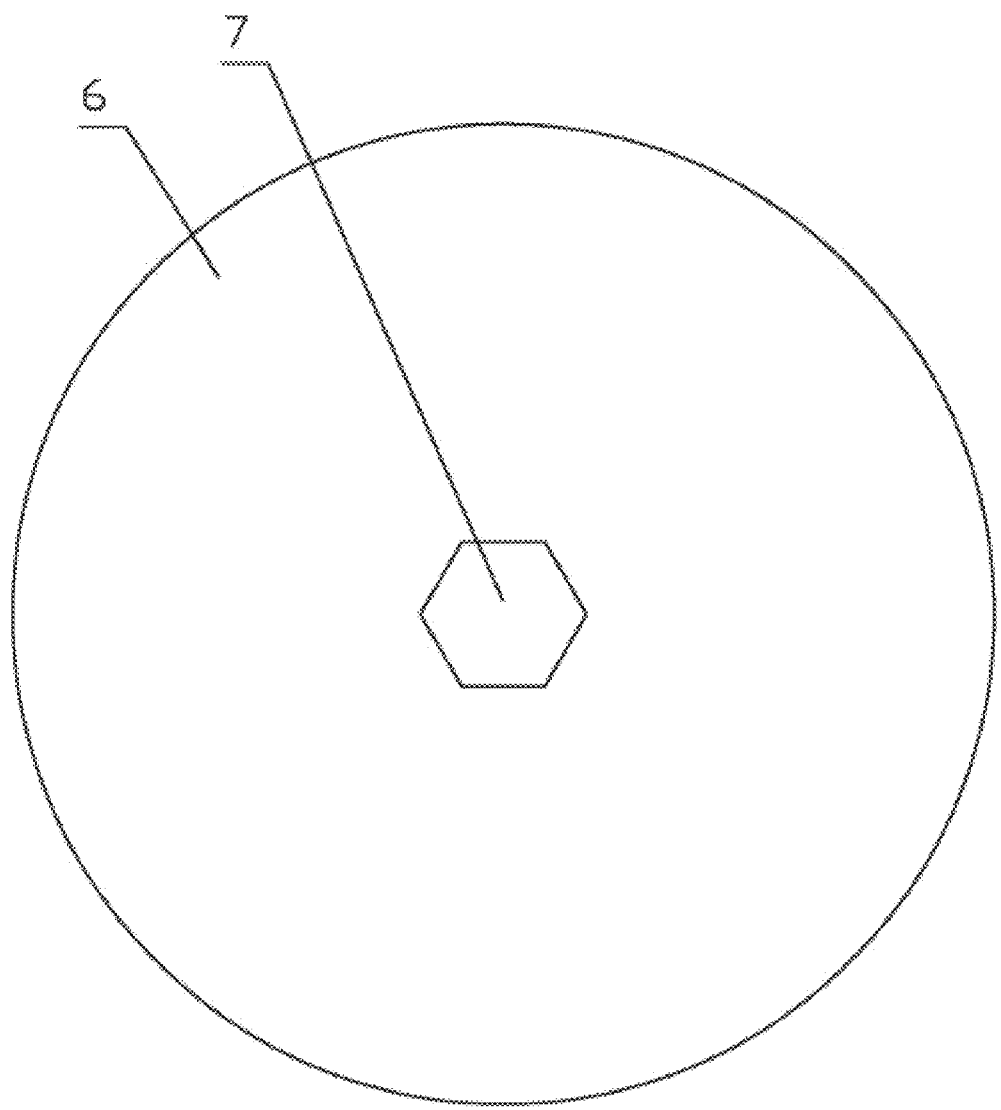
FIG. 7 is a schematic structural top view of a housing according to the present application.

As shown in FIGS. 1 to 7, in a method for assembling a pole terminal of a cylindrical battery, a composite current collector plate is included. The composite current collector plate includes a current collector plate 1. An irregular-shaped screw 2 is fixed at a central position of the current collector plate 1. An irregular-shaped seal gasket 3 is sleeved on an outer side of the irregular-shaped screw 2. The current collector plate 1 is laser welded to a tab of a core 4. An insulating sheet 5 covers the current collector plate 1. A housing 6 covers the insulating sheet 5, the composite current collector plate, and the core 4. An irregular-shaped hole 7 fitting the irregular-shaped seal gasket 3 is opened at a center of the housing 6. The irregular-shaped screw 2 extends upward through the irregular-shaped hole 7 to reach an outer side of a top of the housing 6 to be threadedly connected to a composite nut. The composite nut includes a nut 8 and a nut seal gasket 9 placed between the nut 8 and the housing 6. The nut 8 and the irregular-shaped screw 2 fit and are tightened to clamp and fix the housing 6. A threaded fit between the nut 8 and the irregular-shaped screw 2 is welded and fixed with laser, so that while the nut 8 is kept from loosening, gap fusion is implemented to ensure a reliable electrical connection.

The irregular-shaped screw 2 includes a screw base 10, an irregular-shaped screw rod 11, and a threaded rod 12, and the screw base 10 and the current collector plate 1 are laser welded.

The irregular-shaped seal gasket 3 and the irregular-shaped screw rod 11 are integrally combined. The irregular-shaped seal gasket 3 and the irregular-shaped screw rod 11 include various shapes, and preferably may have a hexagonal shape.

The insulating sheet 5 is configured to isolate a short-circuit mode between the current collector plate 1 and the housing 6.

The irregular-shaped seal gasket 3 and the irregular-shaped hole 7 fit to position mounting of the housing 6, to meet a positioning requirement of the housing 6 and the irregular-shaped screw 2 in an assembly process.

The nut 8 and the nut seal gasket 9 are integrally combined.

The nut seal gasket 9 and the irregular-shaped seal gasket 3 fit for isolating a short-circuit mode between the nut 8 and the irregular-shaped screw 2 and the housing 6.

A material of the nut 8 includes aluminum, copper, nickel, copper-plated nickel, or the like. The material of the nut 8 can be flexibly selected for a pack application end, so that the application range is wide.

The current collector plate 1 and the irregular-shaped screw 2 are made of copper.

The housing 6 is made of aluminum.

Working Principle:

During assembly, specific steps are as follows:

step 1: laser welding the irregular-shaped screw 2 at the central position of the current collector plate 1, and sleeving the irregular-shaped seal gasket 3 on the outer side of the irregular-shaped screw 2, to form the composite current collector plate;

step 2: laser welding the current collector plate 1 to the tab of the core 4, and arranging the irregular-shaped screw 2 facing upward;

step 3: covering the current collector plate 1 with the insulating sheet 5;

step 4: covering the insulating sheet 5 and the core 4 with the housing 6 with an opening facing downward, and opening the irregular-shaped hole 7 fitting the irregular-shaped seal gasket 3 at the center of the top of the housing 6 for positioning, where the irregular-shaped screw 2 extends upward through the irregular-shaped hole 7 to reach the outer side of the top of the housing 6;

step 5: combining the nut 8 and the nut seal gasket 9 to form the composite nut;

step 6: rotatably mounting the composite nut on the irregular-shaped screw 2, and fitting and tightening the nut 8 and the irregular-shaped screw 2 to clamp and fix the housing 6; and step 7: welding and fixing the threaded fit between the nut 8 and the irregular-shaped screw 2 from above with laser, so that while the nut 8 is kept from loosening, gap fusion is implemented to ensure a reliable electrical connection.

The above specific implementations cannot be taken as a limitation on the scope of protection of the present application, and for a person skilled in the art, any replacement, improvement or variation made to the implementations of the present application fall within the scope of protection of the present application.

All aspects of the present application not described in detail are known to a person skilled in the art.

The invention claimed is:

1. A method for assembling a pole terminal of a cylindrical battery, wherein the method comprises the following specific steps:

step 1: laser welding an irregular-shaped screw at a central position of a current collector plate, and sleeving an irregular-shaped seal gasket on an outer side of the irregular-shaped screw, to form a composite current collector plate;

step 2: laser welding the current collector plate to a tab of a core, and arranging the irregular-shaped screw facing upward;

step 3: covering the current collector plate with an insulating sheet;

step 4: covering the insulating sheet and the core with a housing with an opening facing downward, and opening an irregular-shaped hole fitting the irregular-shaped seal gasket at a center of a top of the housing for positioning, wherein the irregular-shaped screw extends upward through the irregular-shaped hole to reach an outer side of the top of the housing;

step 5: combining a nut and a nut seal gasket to form a composite nut;

step 6: rotatably mounting the composite nut on the irregular-shaped screw, and fitting and tightening the nut and the irregular-shaped screw to clamp and fix the housing; and step 7: welding and fixing a threaded fit between the nut and the irregular-shaped screw from above with laser.

2. The method for assembling a pole terminal of a cylindrical battery according to claim 1, wherein the irregular-shaped screw comprises a screw base, an irregular-shaped screw rod, and a threaded rod, and the screw base and the current collector plate are laser welded.

3. The method for assembling a pole terminal of a cylindrical battery according to claim 2, wherein the irregular-shaped seal gasket and the irregular-shaped screw rod are integrally combined.

4. The method for assembling a pole terminal of a cylindrical battery according to claim 1, wherein the insulating sheet is configured to isolate a short-circuit mode between the current collector plate and the housing.

5. The method for assembling a pole terminal of a cylindrical battery according to claim 1, wherein the irregular-shaped seal gasket and the irregular-shaped hole fit to position mounting of the housing.

6. The method for assembling a pole terminal of a cylindrical battery according to claim 1, wherein the nut and the nut seal gasket are integrally combined.

7. The method for assembling a pole terminal of a cylindrical battery according to claim 1, wherein the nut seal gasket and the irregular-shaped seal gasket fit for isolating a short-circuit mode between the nut and the irregular-shaped screw and the housing.

8. The method for assembling a pole terminal of a cylindrical battery according to claim 1, wherein a material of the nut comprises aluminum, copper, nickel, or copper-plated nickel.

9. The method for assembling a pole terminal of a cylindrical battery according to claim 1, wherein the current collector plate and the irregular-shaped screw are made of copper.

10. The method for assembling a pole terminal of a cylindrical battery according to claim 1, wherein the housing is made of aluminum.

* * * * *